United States Patent [19]
Gizara et al.

[11] Patent Number: 6,104,791
[45] Date of Patent: Aug. 15, 2000

[54] SYSTEM AND METHOD FOR PERFORMING TELEPHONE LINE-IN-USE DETECTION, EXTENSION PICK-UP DETECTION, AND REMOTE HANG-UP DETECTION IN A MODEM

[75] Inventors: Andrew R. Gizara, Lake Forest; Robert W. Frankland, Laguna Hills, both of Calif.

[73] Assignee: Conexant Systems, Inc., Newport Beach, Calif.

[21] Appl. No.: 09/096,851

[22] Filed: Jun. 11, 1998

[51] Int. Cl.$^7$ .................................................. H04M 11/00
[52] U.S. Cl. ..................................... 379/93.28; 379/93.09
[58] Field of Search .............................. 379/93.05–93.11, 379/93.28, 93.34, 93.37, 100.06, 100.12, 100.15, 100.16, 377, 381–383

[56] References Cited

U.S. PATENT DOCUMENTS

| | | |
|---|---|---|
| 5,422,939 | 6/1995 | Kramer, et al. . |
| 5,506,891 | 4/1996 | Brown ................................. 379/100.06 |
| 5,535,265 | 7/1996 | Suwandhaputra ..................... 379/93.28 |

FOREIGN PATENT DOCUMENTS

WO 97 23985   7/1997   WIPO .

Primary Examiner—Wing F. Chan
Attorney, Agent, or Firm—Akin, Gump, Strauss, Hauer & Feld, LLP

[57] ABSTRACT

A device connectable to a telephone line including detection circuitry for detecting telephone line events, such as telephone line-in-use, extension pick-up, and remote hang-up. The telephone line events are detected by monitoring the line voltage and loop current transmitted through the telephone line from a central office. A voltage sensor is connected to the telephone line to detect changes in the line voltage appearing in the telephone line. The changes detected in the line voltage are used in a line-in-use detection circuit to determine if the telephone line is already being used by another extension, while changes in loop current are used in a remote hang-up detection circuit to determine when a remote party ends their connection with the telephone line. An extension pick-up circuit is further provided for sensing changes in the telephone loop current in order to determine if a telephone extension has been picked up. If any of the circuits sense that one of these telephone conditions has occurred, the device may then change its mode of operation.

20 Claims, 7 Drawing Sheets

SYSTEM AND METHOD FOR PERFORMING TELEPHONE LINE-IN-USE DETECTION, EXTENSION PICK-UP DETECTION, AND REMOTE HANG-UP DETECTION IN A MODEM

FIELD OF THE INVENTION

The present invention relates generally to a modem having detection circuitry for particular telephone line events, and specifically to a system and method for detecting telephone line-in-use, extension pick-up, and remote hang-up in a modem.

BACKGROUND OF THE INVENTION

Modem communication over telephone lines has gained widespread usage with the growing number of multi-media applications implemented using personal computers. Personal computers (PCs) now perform many different types of data transfers over telephone lines, such as accessing the "Internet," communicating data files between PCs, sending and receiving facsimiles, and acting as an answering machine by sending and receiving voice information over the telephone lines. Modems are used to convert between a computer's digital signals and analog signals that can be carried on the telephone network's analog transmission lines.

In using a modem to interface a telephone line for such data transfers, there are several telephone line conditions that can adversely affect the performance of the modem and/or the telephone connection. For instance, in households having multiple telephone extensions connected to a single telephone line, it is possible for a person to try to establish a modem connection with the telephone line while another person in the household is already talking over the telephone line using another telephone extension. If the telephone line is already in use, the person on the telephone will hear annoying "popping" sounds generated by the modem trying to go off-hook in order to dial out. Further, most modems are configured to repeatedly reattempt to seek a dial tone to thereby enter the off-hook mode after failed previous attempts. This results in the annoying "popping" sounds being periodically heard by the persons speaking on the telephone while the modem attempts to dial out. There is a need for a modem system which recognizes when a telephone line is already in use, so that it does not attempt to enter the off-hook mode at that time.

Further, when a modem is used in connection with performing answering machine functions, several difficulties may arise. Once the modem receives an incoming telephone call and enters an answering machine mode, such as commencing with its outgoing message or recording an incoming message, it is possible for a person to pick-up the telephone extension during the progression of the answering machine mode. This may often occur when a person hears an incoming phone call but is not able to pick-up the telephone extension until after the modem has already initiated the answering machine mode. There is a need for a modem which recognizes when the telephone extension goes off-hook after the modem has already entered the answering machine mode, so that the modem can exit the answering machine mode and allow normal telephone conversation to occur over the telephone extension.

Also, most modems communicate by negotiating commands between the calling and receiving modems. Once the calling modem has completed its transmission, the calling modem typically sends a command to the receiving modem indicating that the transmission is complete. The receiving modem then knows to go on-hook (hang-up). However, when receiving voice information while operating in an answering machine mode, modems will not receive such commands over the telephone line indicating that the voice message has been completed. There is a need for a modem which recognizes when the party on the remote end of the telephone line connection goes on-hook, in order to notify the modem in answering machine mode to stop recording.

SUMMARY OF THE INVENTION

The present invention overcomes the aforementioned shortcomings associated with the prior art by providing a system and method for performing telephone line-in-use, extension pick-up, and remote hang-up detection in a modem.

These as well as additional advantages of the present invention are achieved by providing automated circuitry in a modem for detecting telephone line events, including whether the telephone line is already in use, whether another telephone extension has been picked-up, and whether the remote party has hung-up. These telephone line events are detected by monitoring a line voltage and loop current supplied in the telephone line from a central office. A voltage sensor is connected to the telephone line to detect changes in the line voltage appearing in the telephone line. The change detected in the line voltage is used by a line-in-use detection circuit to determine if the telephone is already in use. Interruptions in the loop current are monitored by a remote hang-up detection circuit to determine if the remote party has hung-up. An extension pick-up circuit is further provided for sensing changes in the telephone loop current in order to determine if a telephone extension has been picked up. If any of the circuits sense that one of these telephone conditions has occurred, the modem is notified to change its operation accordingly.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system and method for detecting telephone line-in-use, extension pick-up, and remote hang-up in a modem.

Figure 1:
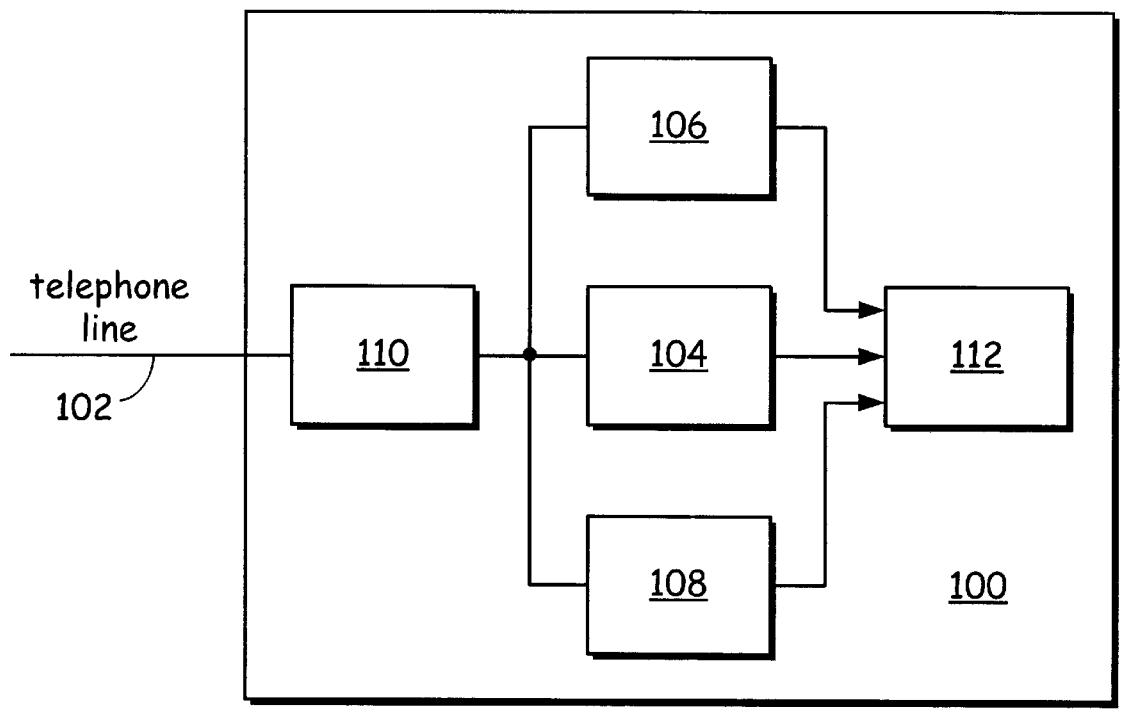
FIG. 1 is a block schematic illustration of a modem including the detection circuitry of the present invention.

The system and method of the present invention allows telephone line-in-use, extension pick-up, and remote hang-up events on a telephone line to be detected by automated circuitry in a modem 100. The modem 100, illustrated in block schematic form in FIG. 1, is connected to a telephone line 102, where the modem 100 includes a telephone line-in-use detection circuit 104 for detecting when another telephone extension (not shown) is already using the telephone line 102, an extension pick-up detection circuit 106 to detect when a telephone extension connected to the telephone line 102 has gone off-hook (i.e., was picked up by a person), and a remote hang-up detection circuit 108 to detect when the party on the remote end of the telephone line 102 connection has gone on-hook (i.e., hung-up).

The telephone line 102 is connected to a central office which supplies a line voltage and loop current over the telephone line 102 to each telephone extension. The modem 100 detects the events on the telephone line 102 by monitoring the line voltage and loop current in the telephone line 102. The signals entering the modem 100 from the telephone line 102 are first passed through an interface and conditioning circuitry 110 where a variety of functions are performed, including ensuring that a constant current is drawn from the telephone line 102 when the modem 100 enters the off-hook mode. The line voltage is then passed to the telephone line-in-use detection circuit 104 and remote hang-up detection circuit 108, while the telephone line 102 loop current is passed to the extension pick-up detection circuit 106. The outputs of each of the circuits 102, 104, and 106 are connected to respective pins on a microcontroller 112, so that an output signal is communicated to the microcontroller 112 when one of the above-described telephone line events is detected. The microcontroller 112 may then adjust the operation of the modem 100 accordingly.

The modem 100 utilizes the telephone line-in-use detection circuit 104 to detect when the telephone line 102 to which it is connected is already being used by another extension connected to the telephone line 102. The modem 100 will then know that the telephone line 102 is already in use, and the modem 100 will not attempt to enter the off-hook mode at that time. Thus, the modem 100 of the present invention will not generate sounds on the telephone line 102 in an attempt to dial out when another extension is using the telephone line 102, and the persons already using the telephone line 102 will not be bothered by annoying "popping" sounds generated by modems when attempting to go off-hook.

Figure 2:
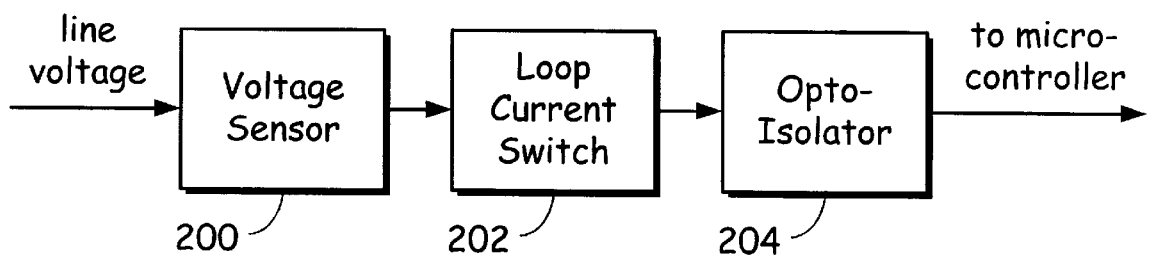
FIG. 2 is a block schematic illustration of the telephone line-in-use detection circuit of the present invention.

Referring now to FIG. 2, a block schematic of the telephone line-in-use detection circuit 104 is illustrated. The line voltage from the telephone line 102 is fed into a voltage sensor 200. The voltage sensor 200 detects when a change in the line voltage has occurred, indicating that an extension connected to the telephone line 102 is off-hook (i.e., the telephone line is already in use). As indicated above, the central office supplies a line voltage over the telephone line 102 to all of the extensions of the telephone line 102. When an extension connected to the telephone line 102 goes off-hook, the line voltage supplied from the central office is dramatically decreased. For instance, it is common for the central office to supply a line voltage of approximately 48 volts during an on-hook condition while reducing the line voltage to approximately 6 volts when an off-hook condition is present.

The voltage sensor 200 is connected to a loop current switch 202, where the voltage sensor 200 produces an output activating the loop current switch 202 when the change in line voltage indicates that an extension is off-hook. When activated, loop current switch 202 allows a current to flow through an opto-isolator 204. The opto-isolator 204 provides the necessary isolation for the internal components of the modem 100 from the telephone line 102 in case of electrical surges, including lightning strikes. Opto-isolator 204 is further connected to a corresponding pin on the microcontroller 112. The opto-isolator 204 is activated by the current flowing through it, where opto-isolator 204 then produces an output signal which changes the level of the microcontroller pin. The microcontroller 112 will then know that the telephone line is already in use, and the microcontroller 112 will instruct the modem 100 to not attempt to go off-hook.

Figure 3:
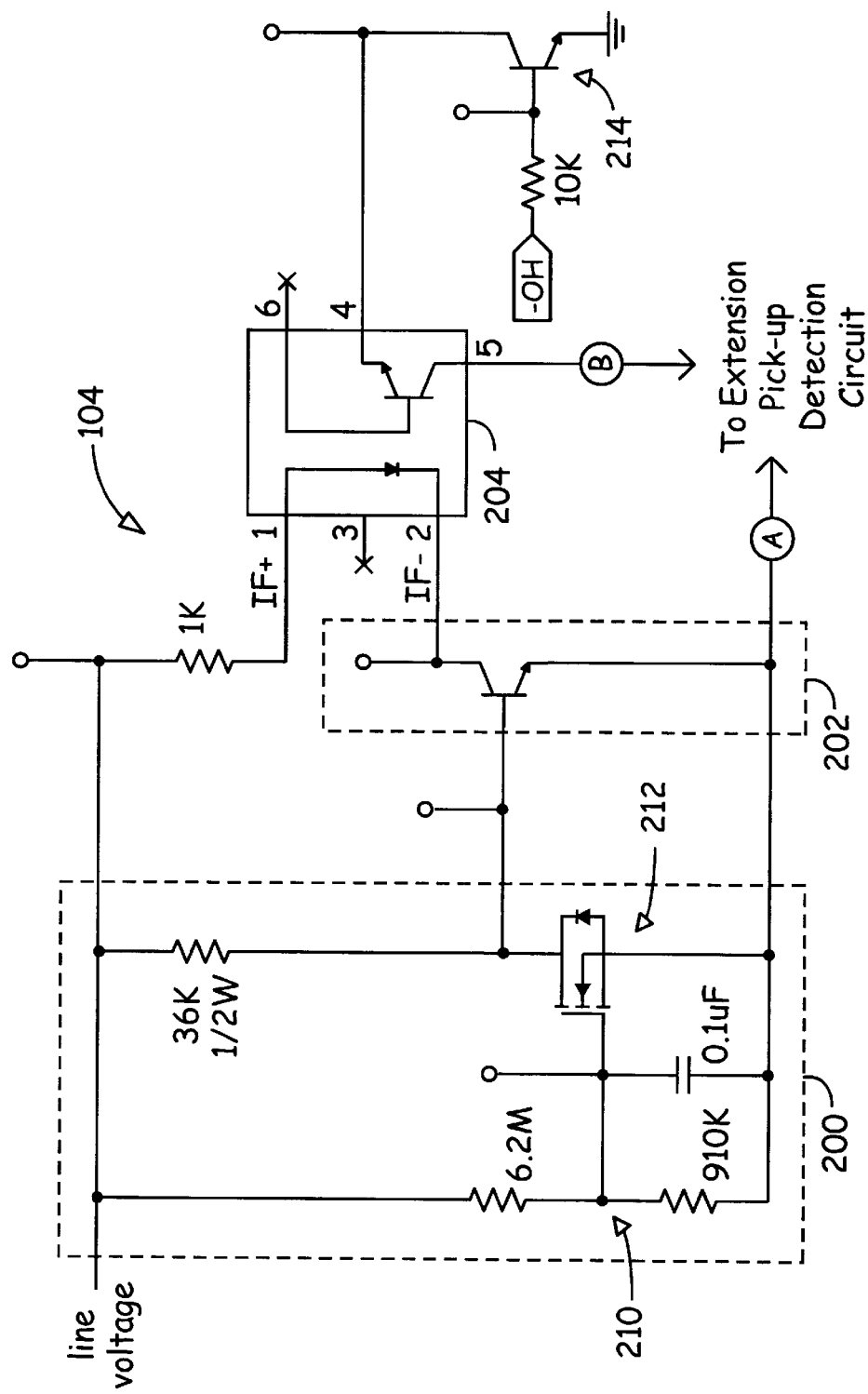
FIG. 3 is a detailed electrical schematic diagram of a preferred embodiment of the telephone line-in-use detection circuit of FIG. 2.

A detailed electrical schematic diagram of a possible embodiment of the telephone line-in-use detection circuit 104 of the present invention is illustrated in FIG. 3. The voltage sensor 200 includes a voltage divider 210 which feeds a voltage to the gate of a field-effect transistor (FET) 212. The FET 212 has a predetermined threshold voltage which must be applied to the gate of the FET 212 to switch current through the device. The FET 212 is normally in an on-state, allowing current to flow through the FET 212. The voltage divider 210 sets the change in line voltage which occurs when a telephone extension goes off-hook to match the gate threshold of the FET 212, so that the FET 212 is deactivated when a telephone extension connected to the telephone line 102 is off-hook. Once deactivated, the current is switched to flow through the loop current switch 202. Turning off the FET 212 (when an extension goes off-hook) activates the loop current switch 202, which is preferably a bipolar transistor or similar device. The loop current switch 202 gates a current through to the opto-isolator 204, where the opto-isolator 204 is activated by the current flowing to it. The opto-isolator 204 changes the level of a pin (~EXTOH) in the microcontroller 112, where the output of opto-isolator 204 is communicated through line B to the (~EXTOH) pin shown in the extension pick-up detection circuit of FIG. 6.

The telephone line-in-use detection circuit 104 is further configured to prevent the level of the pin (~EXTOH) in the microcontroller 112 from being changed when the modem 100 itself is operating in the off-hook mode. This prevents the telephone line-in-use detection circuit 104 from falsely providing an indication that the telephone line 102 is already in use by detecting the modem 100's use of the telephone line 102. In order to prevent the pin (~EXTOH) from having its level changed, the opto-isolator 204 is prevented from communicating a signal through line B. A pin (~OH) from the microcontroller 112 is connected to the opto-isolator 204 through a bipolar transistor 214. When the modem 100 itself is in the off-hook mode, a deactivation signal is transmitted from the microcontroller 112 through the transistor 214 to the opto-isolator 204. By deactivating the opto-isolator 204, current is prevented from flowing through the opto-isolator 204 and, thus, no signal is output by the opto-isolator 204 to the microcontroller 112.

With the widespread possible uses of a personal computer, it is now possible for the personal computer to be used as an answering machine for incoming telephone calls. The system and method of the present invention allows the modem 100 connecting the personal computer to the telephone line 102 to be used in an answering machine mode in a more efficient manner. When receiving voice information while operating in an answering machine mode, the modem 100 provides a person with the flexibility of accepting an incoming telephone call by picking up a telephone extension after the modem has already begun receiving the voice information. Thus, the modem 100 stops its operation when a person picks up a telephone extension to answer an incoming call, so that the modem 100 does not interfere with the conversation transpiring over the telephone line 102. Therefore, the modem 100 of the present invention includes an extension pick-up detection circuit 106 to detect when a telephone extension has gone off-hook (was picked up by a person answering the telephone), so that the modem 100 will exit the answering machine mode and not interfere with the conversation over the telephone extension.

Figure 4:
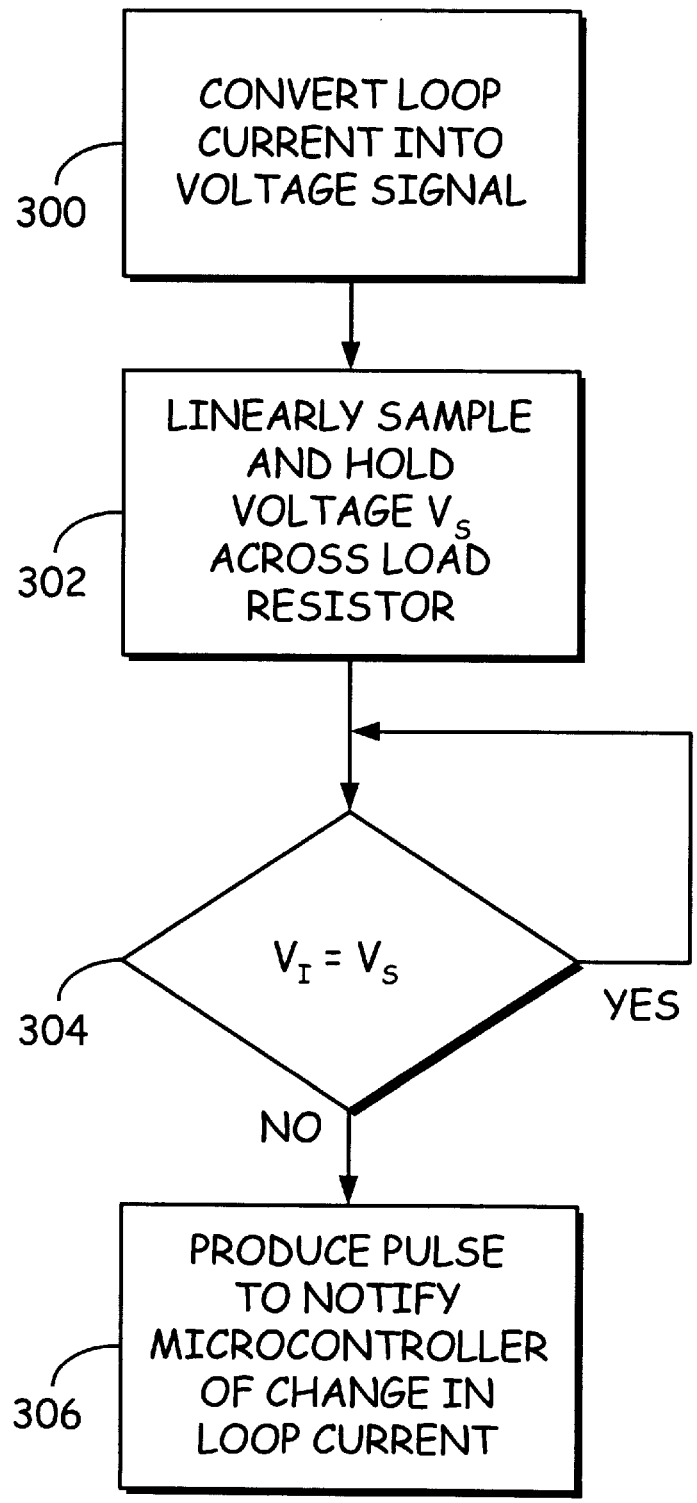
FIG. 4 is an operational block diagram of the method for detecting when a telephone extension has gone off-hook in accordance with the present invention.

The extension pick-up detection circuit 106 detects when a telephone extension has gone off-hook by sensing changes in the telephone loop current from the central office. While the modem 100 is communicating with the central office through the telephone line 102, a noticeable change in the telephone loop current will occur when another telephone extension connected to the telephone line is picked up. The method by which the extension pick-up circuit 106 detects the change in telephone loop current is shown in the operational block diagram of FIG. 4.

In step 300, the loop current from the telephone line 102 is converted into a voltage, such as by feeding the loop current through an opto-isolator and passing an output current from the opto-isolator through a load resistance. A voltage across the load resistance is linearly "sampled and held" ($V_S$) in step 302. The instantaneous voltage ($V_I$) appearing across the load resistance is then compared with the linearly "sampled and held" voltage ($V_I$) in step 304. If there has been a change in the loop current, then there will be a drop in the instantaneous voltage ($V_I$), thus resulting in a difference between the instantaneous voltage ($V_I$) and the linearly "sampled and held" voltage ($V_S$). In response to this difference between the compared voltages, an output pulse is produced and communicated to a respective pin of the microcontroller 112 in step 306 in order to notify the microcontroller 112 of the change in loop current. The microcontroller 112 will then know that a person has picked-up a 25 telephone extension, and it will cause the modem 100 to cease its answering machine mode of operation. If there is no difference between the instantaneous voltage ($V_I$) and the linearly "sampled and held" voltage (Vs), then the extension pick-up detection circuit 106 returns to step 304 where the voltage comparison step is repeated. The instantaneous voltage ($V_I$) and the linearly "sampled and held" voltage ($V_I$) are compared for the entire duration of the answering machine mode of operation.

Figure 5:
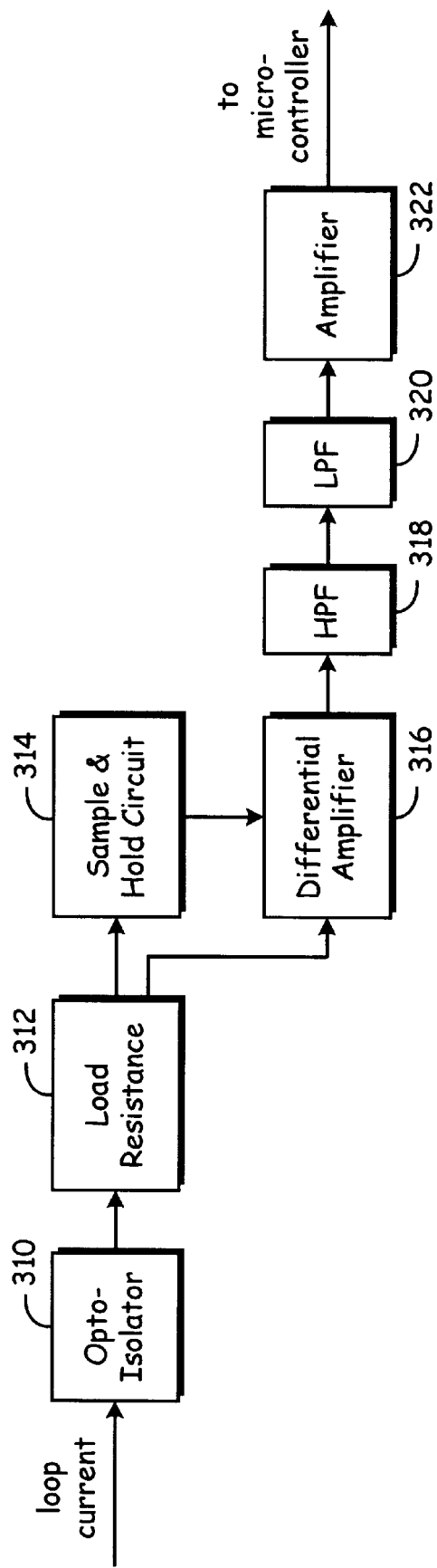
FIG. 5 is a block schematic illustration of the extension pick-up detection circuit of the present invention.

The operation of the extension pick-up detection circuit 106 will be described with further reference to its components illustrated in the schematic block diagram of FIG. 5. The loop current from the telephone line 102 is fed into a photo-Darlington opto-isolator 310 operating in its active (neither saturated nor cut-off) region. The Darlington pair transistors are arranged in emitter follower fashion. A load resistance 312 is connected to the photo-Darlington optical isolator 310, where the loop current flowing through the photo-Darlington opto-isolator 310 is translated into a voltage appearing across the load resistance 312. The voltage appearing across the load resistance 312 is linearly "sampled and held" using a sample and hold circuit 314. The linearly "sampled and held" voltage ($V_S$) has a delayed response, so that immediate changes in the voltage will not immediately affect the value of the linearly "sampled and held" voltage ($V_S$). The linearly "sampled and held" voltage ($V_S$) is fed into one input of a differential amplifier 316. The load resistance 312 is also connected to another input of the differential amplifier 316, so that the instantaneous voltage ($V_I$) appearing across the load resistance 312 is also input into the differential amplifier 316. The instantaneous voltage ($V_I$) appearing across the load resistor is then compared with the linearly "sampled and held" voltage ($V_S$) in the differential amplifier 316. Any difference between the instantaneous voltage ($V_I$) and the linearly "sampled and held" voltage ($V_S$) will cause the differential amplifier 316 to output a pulse signal. The differential amplifier 316 is preferably formed of inexpensive discrete NPN transistors in order to provide a cost-effective differential amplifier 316.

Figure 6:
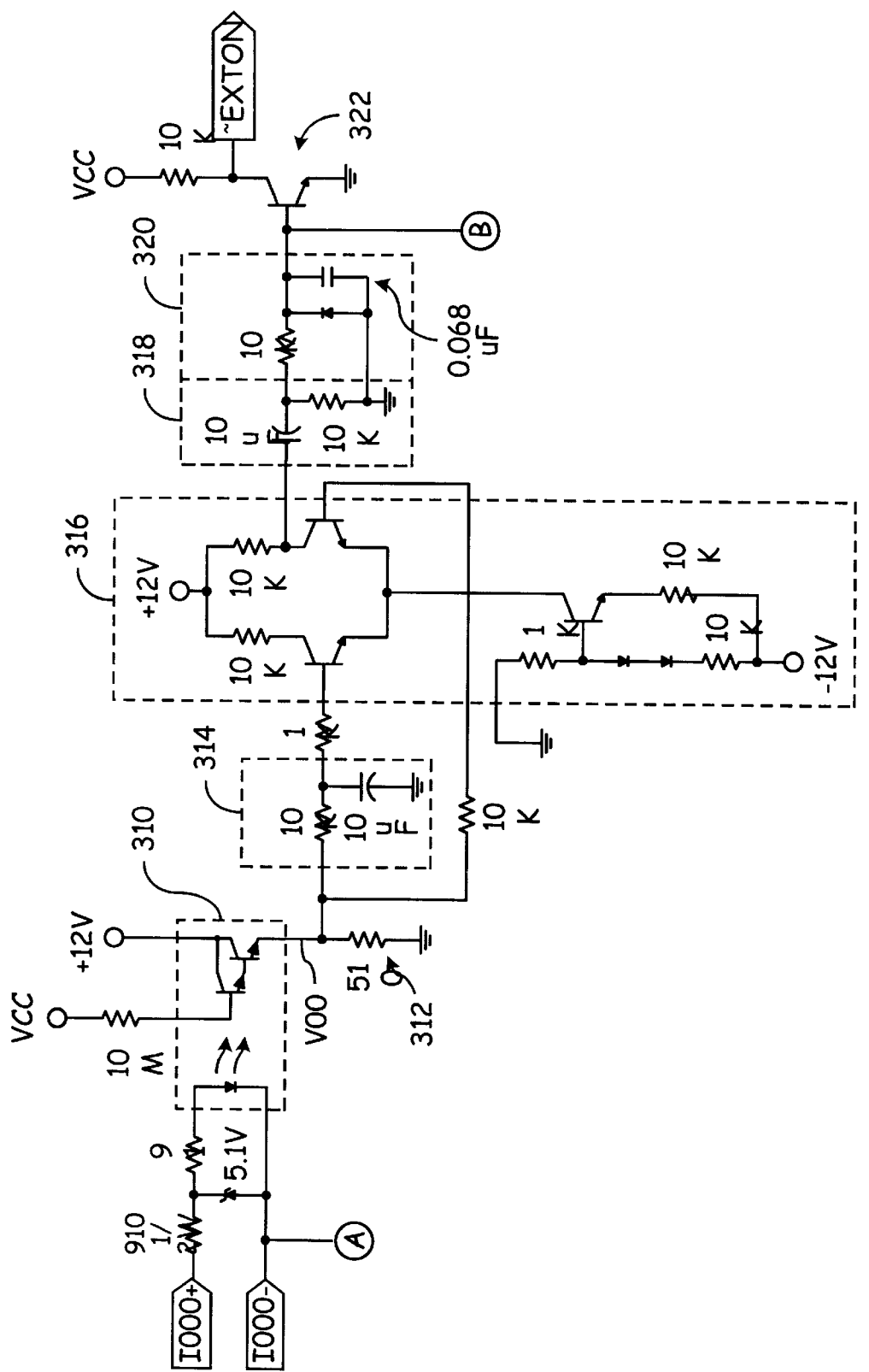
FIG. 6 is a detailed electrical schematic diagram of a preferred embodiment of the extension pick-up detection circuit of FIG. 5.

The output pulse from the differential amplifier 316 is passed through a high-pass filter 318 to reject DC offset and common mode voltage out of the differential amplifier 316, and then through a low-pass filter 320 to reject any power supply noise which may cause false output pulses. The output pulse is passed from the low-pass filter 320 to feed a common emitter NPN amplifier 322 which provides amplification of the current, resulting in a pulse of long enough duration for the microcontroller to sense on one of its input pins (EXTOH). A detailed electrical schematic of a possible embodiment of the extension pick-up detection circuit 106 is illustrated in FIG. 6, where the components of FIG. 6 function equivalently to their respective similarly numbered components described above in conjunction with FIG. 5. As can be seen, the extension pick-up circuit 106 uses only discrete transistors to perform its voltage comparison, thus providing an extremely cost-effective manner of detecting extension pick-up by monitoring changes in the loop current through the telephone line 102.

Modems typically operate by communicating command signals between a transmitting modem and a receiving modem, so that the receiving modem is aware when a message from the transmitting modem is beginning and ending. However, when receiving voice information while operating in an answering machine mode, modems will not be communicating with a transmitting modem and will not receive such commands over the telephone line indicating that the voice message has been completed. Without such commands, the modem will not know when to end its answering machine mode and stop recording the incoming message. Thus, the modem 100 of the present invention includes a remote hang-up detection circuit 108 to detect when the party on the remote end of the connection has gone on-hook (hung-up), and the modem in the answering machine mode then knows to stop recording.

The remote hang-up detection circuit 108 monitors for changes in the loop current transmitted in the telephone line 102 from the central office. When the remote party hangs-up, a sudden interruption in the loop current supplied by the central office in the telephone line 102 will occur. The remote hang-up detection circuit 108 detects this sudden drop in loop current and informs the microcontroller 112 of this change. The microcontroller 112 then causes the modem 100 to cease operating in the answering machine mode and stop recording.

Figure 7:
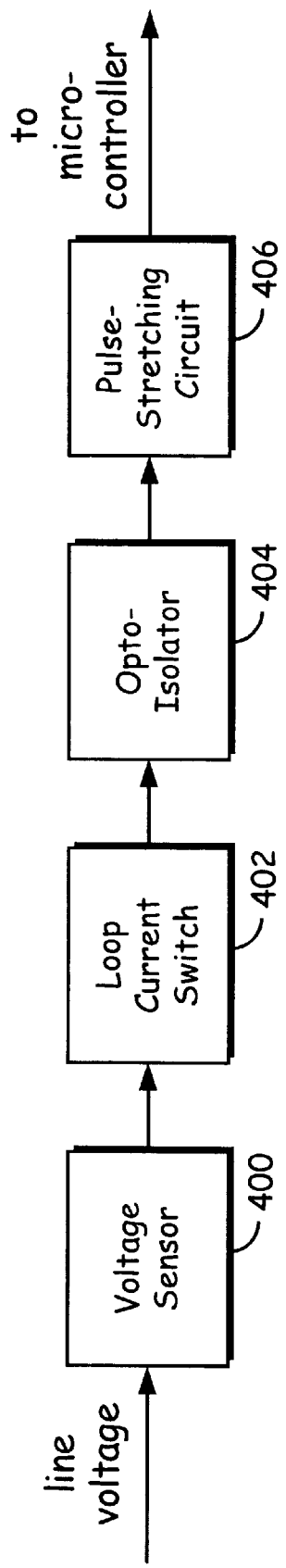
FIG. 7 is a block schematic illustration of the remote hang-up detection circuit of the present invention.

Referring now to FIG. 7, a block schematic of the remote hang-up detection circuit 108 is illustrated. The line voltage from the telephone line 102 is fed into a voltage sensor 400. The voltage sensor 400 is connected to a loop current switch 402, where the voltage sensor 400 produces an output activating the loop current switch 402 as long as the modem is off-hook. Voltage sensor 400 will continue to activate the loop current switch 402 until the change in loop current indicates that the remote party on the telephone line 102 has gone on-hook. When the remote party goes on-hook, the opto-isolator 404 translates the interruption in loop current which occurs to the pulse-stretching circuit 406. Voltage sensor 400 and loop current switch 402 function equivalently to the voltage sensor 200 and loop current switch 202 of the telephone line-in-use detection circuit 104. However, the remote hang-up detection circuit 108 detects the remote hang-up event when the loop current switch 402 is activated by the modem in use, while the telephone line-in-use detection circuit detects the line-in-use event when the loop current switch 202 is activated by an extension off-hook. In a preferred embodiment of the present invention, the voltage sensor 200 and loop current switch 202 of the telephone line-in-use detection circuit 104 may also be connected to the remote hang-up detection circuit 108, so that the output current from the loop current switch 202 may be used to perform both remote hang-up detection and telephone line-in-use detection. This reduces the number of components required to perform both remote hang-up detection and telephone line-in-use detection. It is understood that the remote hang-up detection circuit 108 may also include its own separate voltage sensor 400 and loop current switch 402.

The current from loop current switch 402 is used to activate an opto-isolator 404. When the remote party goes on-hook (i.e., hangs-up), the opto-isolator 404 will detect an interruption in loop current by the central office on the telephone line 102. This, in turn, prevents current from flowing through the opto-isolator 404, causing the deactivation of opto-isolator 404. The deactivated opto-isolator 404 then causes an output signal to be produced and passed through a pulse-stretching circuit 406. The pulse-stretching circuit 406 stretches the length of the output pulse signal to a level recognizable by the microcontroller 112, which allows the microcontroller 112 to distinguish between a remote hang-up event and other telephone events communicated to the microcontroller 112, such as the extension pick-up event likely to be communicated to the microcontroller 112 by the extension pick-up circuit 106. The pulse-stretched signal is then output to a respective pin on the microcontroller 112. The microcontroller 112 will then know that the a change in line voltage corresponding to a remote hang-up has occurred, and the microcontroller 112 will instruct the modem 100 to cease its answering machine mode of operation.

Figure 8:
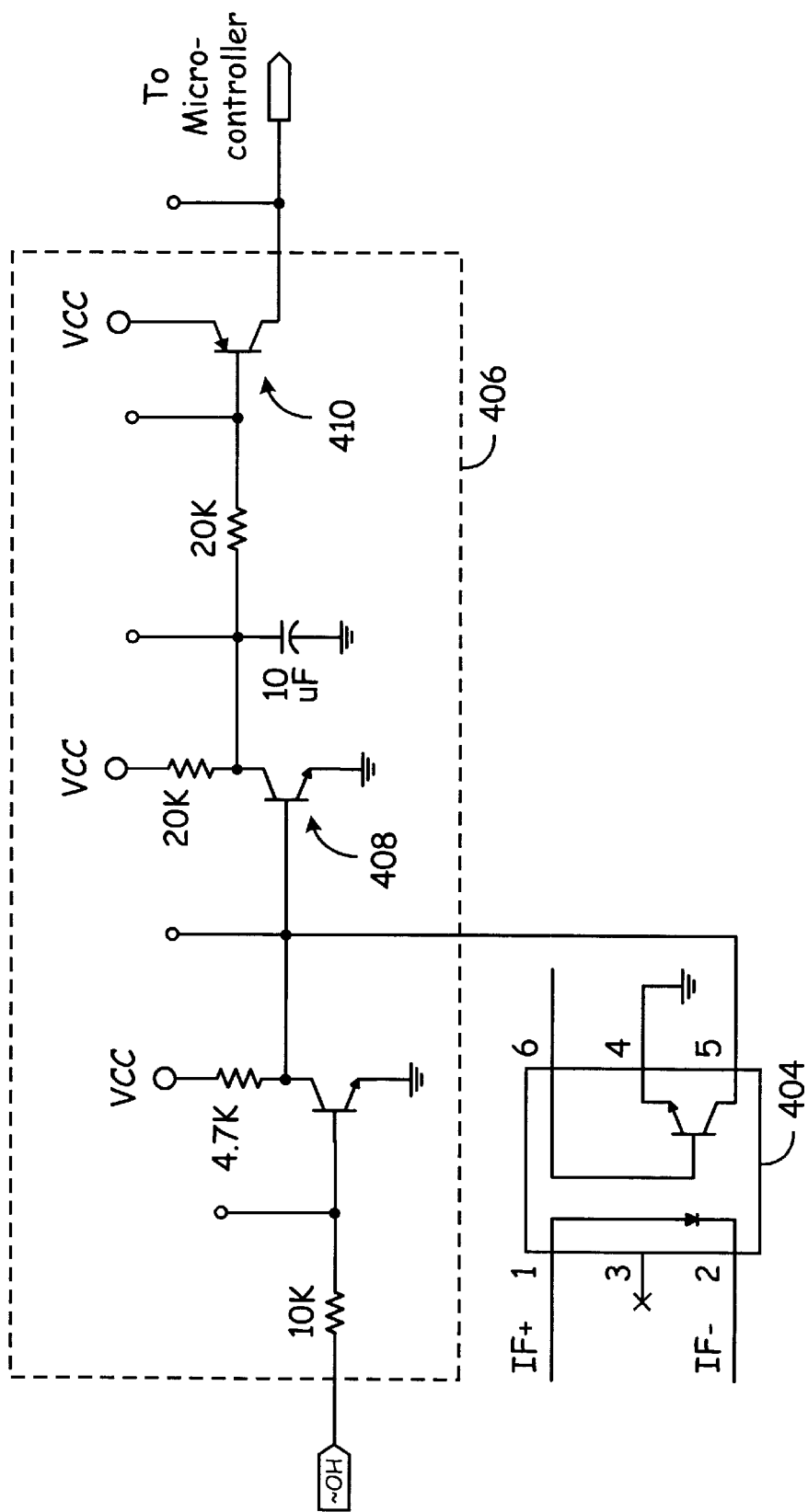
FIG. 8 is a detailed electrical schematic diagram of a preferred embodiment of the remote hang-up detection circuit of FIG. 7.

A detailed electrical schematic diagram of a possible embodiment of the remote hang-up detection circuit 108 of the present invention is illustrated in FIG. 8. In this embodiment, the current (IF) from the loop current switch 202 of the line-in-use detection circuit 104 is used to turn on the opto-isolator 404. While the opto-isolator 404 is on, it serves as a sink dissipating the current flowing through it to ground. When a remote party hangs-up, the interruption in loop current by the central office controlling the telephone line 102 will cause a break in the current (IF) flowing through the opto-isolator 404. The break in current (IF) deactivates the opto-isolator 404, which then allows the current which was being dissipated by the opto-isolator 404 to flow through a transistor 408 in the pulse-stretching circuit 406. This current is further used to activate another transistor 410, where the circuit components between transistor 408 and transistor 410 perform the pulse-stretching function. The transistor 410 then outputs the stretched pulse signal to the microcontroller 112, where the microcontroller 112 is able to distinguish this pulse signal as indicating that a remote hang-up event has occurred from an extension pick-up event by the stretched length of the pulse signal. The pulse-stretching circuit 406 is implemented using three discrete transistors, thus allowing the remote hang-up detection circuit 108 to also be formed in an inexpensive manner.

As can be seen from the foregoing, the modem formed in accordance with the present invention allows numerous telephone events to be detected by simply monitoring the line voltage and loop current transmitted through a telephone line using circuit arrangements of inexpensive discrete components. Moreover, by forming a modem with the detection circuitry in accordance with the present invention, telephone line-in-use, extension pick-up, and remote hang-up can be automatically detected by the modem using cost-effective circuitry. Furthermore, by implementing the detection circuitry into a modem in accordance with the present invention, the modem can effectively operate in an answering machine mode of operation In each of the above embodiments, the different systems for detecting telephone line-in-use, extension pick-up, and remote hang-up by the detection circuitry of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for monitoring changes in a line voltage transmitted through a telephone line from a central office to detect when particular events occur on a telephone line in order to control the operation of a modem connected to the telephone line, comprising the steps of:

receiving the line voltage appearing in the telephone line in a voltage sensor;

sensing changes in the line voltage indicative of the occurrence of a particular telephone line event;

outputting an activation signal when a line voltage change of a predetermined value is sensed;

operating a loop current switch with the activation signal to control a flow of current through the loop current switch to an isolation device;

controlling the activation of the isolation device in response to the current flowing through the loop current switch, and transmitting an output signal to a microcontroller device in the modem in response to a change in state of the isolation device to alert the microcontroller device that the particular telephone line condition has occurred.

2. The method of claim 1, wherein changes in a line voltage transmitted through a telephone line are monitored to detect when the connected telephone line is already being used by another telephone extension.

3. A modem including detection circuitry for detecting events occurring on a telephone line connected to the modem, comprising:

an interface connectable to receive signals from the telephone line;

a telephone line-in-use detection circuit, connected to the interface, detecting when the connected telephone line is already being used by another telephone extension by detecting the change of a line voltage appearing in the connected telephone line;

an extension pick-up detection circuit, connected to the interface, detecting when another telephone extension attached to the connected telephone line enters an off-hook mode;

a remote hang-up detection circuit, connected to the interface detecting when a remote telephone extension communicating with the modem through the connected telephone line enters an on-hook mode; and the telephone line-in-use detection circuit translating the change in the line voltage into a switched current.

4. The modem of claim 3, wherein the telephone line-in-use detection circuit includes:

a voltage sensor connected for receiving the line voltage appearing in the connected telephone line and sensing changes in the line voltage, wherein the voltage sensor produces an activation signal when a line voltage change of a predetermined threshold occurs;

a loop current switch connected to receive and be activated by the output signal produced by the voltage sensor; and an opto-isolator connected to the loop current switch, wherein the loop current switch allows current to flow to and activate the opto-isolator, wherein, once activated, the opto-isolator produces an output signal which is transmitted to the microcontroller device to indicate that the telephone line is already in use.

5. The modem of claim 4, wherein the voltage sensor comprises:

a voltage divider connected for receiving the line voltage; and a field-effect transistor having a predetermined threshold voltage which must be applied to a gate of the transistor to switch current flow to the loop current switch, wherein the voltage divider sets the change in line voltage which occurs when a telephone extension goes off-hook to match the predetermined gate threshold voltage.

6. A modem including detection circuitry for detecting events occurring on a telephone line connected to the modem, comprising:

an interface connectable to receive signals from the telephone line;

a telephone line-in-use detection circuit, connected to the interface, detecting when the connected telephone line is already being used by another telephone extension;

an extension pick-up detection circuit, connected to the interface, detecting when another telephone extension attached to the connected telephone line enters an off-hook mode; and a remote hang-up detection circuit, connected to the interface, detecting when a remote telephone extension communicating with the modem through the connected telephone line enters an on-hook mode by detecting changes in a loop current appearing in the connected telephone line.

7. The modem of claim 6, wherein the remote hang-up detection circuit includes:

a loop current switch connected to receive and be activated by the loop current on the telephone line;

an opto-isolator connected to the loop current switch, wherein the loop current can deactivate the opto-isolator, wherein, once deactivated, the opto-isolator causes an output pulse signal to be produced; and a pulse-stretching circuit connected to the opto-isolator for stretching the length of the output pulse signal and transmitting the stretched output pulse signal to the microcontroller device to indicate that the remote device has gone on-hook.

8. The modem of claim 7, wherein the stretching of the length of the output pulse signal performed by the pulse-stretching circuit allows the microcontroller device to distinguish the remote hang-up event from signals identifying other telephone line events.

9. The modem of claim 7, wherein the pulse-stretching circuit comprises:

a plurality of transistors; and a circuit arrangement including a resistance and a capacitance positioned between two of the plurality of transistors for performing the stretching of the output pulse signal.

10. A modem including detection circuitry for detecting events occurring on a telephone line connected to the modem, comprising:

an interface connectable to receive signals from the telephone line;

a telephone line-in-use detection circuit, connected to the interface, detecting when the connected telephone line is already being used by another telephone extension;

an extension pick-up detection circuit, connected to the interface, detecting when another telephone extension attached to the connected telephone line enters an off-hook mode by detecting changes in a loop current appearing in the connected telephone line and a remote hang-up detection circuit, connected to the interface, detecting when a remote telephone extension communicating with the modem through the connected telephone line enters an on-hook mode.

11. The modem of claim 10, wherein the extension pick-up detection circuit includes:

an opto-isolator connected for receiving the loop current appearing in the connected telephone line and producing an output current;

a load resistance connected to the opto-isolator, wherein the output current produces a voltage across the load resistance;

a sampling circuit connected to the load resistance for sampling and holding the voltage appearing across the load resistance;

a comparing circuit connected to both the sampling circuit and the load resistance, wherein the comparing circuit compares the sampled and held voltage from the sampling circuit with an instantaneous voltage appearing across the load resistance and produces an output signal when a difference between the two voltages is detected; and an amplifier device connected to receive the output signal and produce an amplified output pulse to the microcontroller to indicate that another telephone extension attached to the connected telephone line has entered an off-hook mode.

12. The modem of claim 11, wherein the voltage appearing across the load resistance is sampled and held by the sampling circuit continuously while the extension pick-up detection circuit is active.

13. The modem of claim 11, further comprising:

a high-pass filter circuit connected to the comparing circuit for blocking amplifier offset and common mode voltage on the output signal; and a low-pass filter circuit connected between the high-pass filter circuit and the amplifier device for reducing noise in the output signal.

14. The modem of claim 11, wherein the comparing circuit includes a differential amplifier made up of discrete NPN transistors.

15. A method for detecting whether a telephone extension attached to a telephone line has entered an off-hook mode using circuitry connected to the telephone line, comprising the steps of:

receiving a loop current transmitted over the telephone line from a central office;

converting the loop current to a voltage signal;

sampling and holding a value of the voltage signal;

comparing an instantaneous value of the voltage signal with the sampled and held value of the voltage signal to determine if a difference between the two voltage signals exists; and producing an output signal when a difference between the two voltage signals is detected indicating that a change in the loop current in the telephone line has occurred, wherein the change in loop current corresponds to a value indicative that a telephone extension connected to the telephone line has entered an off-hook mode.

16. The method of claim 15, wherein the sampled and held value of the voltage signal is continuously updated.

17. The method of claim 15, wherein the circuitry which detects whether a telephone extension connected to the telephone line has entered an off-hook mode comprises:

an opto-isolator connected for receiving the loop current appearing in the connected telephone line and producing an output current;

a load resistance connected to the opto-isolator, wherein the output current produces a voltage across the load resistance;

a sampling circuit connected to the load resistance for sampling and holding the voltage appearing across the load resistance;

a comparing circuit connected to both the sampling circuit and the load resistance, wherein the comparing circuit compares the sampled and held voltage from the sampling circuit with an instantaneous voltage appearing across the load resistance and produces an output signal when a difference between the voltages is detected; and an amplifier device connected to receive the output signal and produce an amplified output pulse to the microcontroller to indicate that another telephone extension attached to the connected telephone line has entered an off-hook mode.

18. The method of claim 15, wherein the comparing circuit includes a differential amplifier made up of discrete NPN transistors.

19. The method of claim 15, wherein the circuitry which detects whether a telephone extension connected to the telephone line has entered an off-hook mode is included in a modem connectable to the telephone line.

20. A method for detecting when a remote telephone extension communicating with a modem through a connected telephone line enters an on-hook mode, comprising the steps of:

receiving a loop current supplied in the telephone line by a central office;

activating a loop current switch by the received loop current;

controlling the activation of the isolation device in response to the loop current flowing through the loop current switch, wherein the isolation device is deactivated by a predetermined change in the loop current;

causing an output signal to be produced when the isolation device is deactivated;

pulse-stretching the output signal and transmitting the stretched output signal to a microcontroller device in the modem in response to the deactivation of the isolation device to alert the microcontroller device that the remote device has gone on-hook.

* * * * *